June 11, 1963  E. C. PFEFFER, JR  3,092,841
FUSED TAB

Filed Oct. 25, 1960  2 Sheets-Sheet 1

INVENTOR
EDWARD C. PFEFFER JR.

BY *Myron Amer*

ATTORNEY

June 11, 1963 E. C. PFEFFER, JR 3,092,841
FUSED TAB
Filed Oct. 25, 1960 2 Sheets-Sheet 2

INVENTOR
EDWARD C. PFEFFER JR.

BY Myron Amer

ATTORNEY 3,092,841
FUSED TAB
Edward C. Pfeffer, Jr., Troy, N.Y., assignor to Cluett, Peabody & Co., Inc., Troy, N.Y., a corporation of New York
Filed Oct. 25, 1960, Ser. No. 64,835
1 Claim. (Cl. 2—131)

The present invention relates to an improved way of making a multi-ply collar with attached collar tabs and stays, and of attaching the collar tabs and stays to the collar.

According to prior art practice, collar tabs are attached to the collar by stitching. Provision of this attachment stitching is complicated by the requirement that it must not show on the face ply of the collar or else it will detract from the appearance of the completed collar. To satisfy this requirement, it is therefore the practice to stitch the collar tabs to the rear ply of the collar and then to assemble the collar. As a consequence, the collar tabs on the rear collar ply require special handling so as not to interfere with the collar assembly process.

In contrast to the above, the present invention provides for a fused attachment of the collar tabs to the collar, and as a consequence this attachment can be made after completion of the collar and thus at a time when it does not interfere in any way with the normal assembly steps of the collar.

Additionally, the fused attachment provided in accordance with the present invention results in a stronger bond between the collar tabs and the collar. This fused attachment, more particularly, is one existing between the collar tab positioned against the outside face of the rear collar ply and a collar stay positioned against the inside face of the rear collar ply. In this regard, both the collar tab and the collar stay are composed in part of a thermoplastic material, which material is fused together through the interstices of the rear collar ply.

The invention will be better understood from the description which follows and the drawings forming a part thereof in which.

Figure 1:
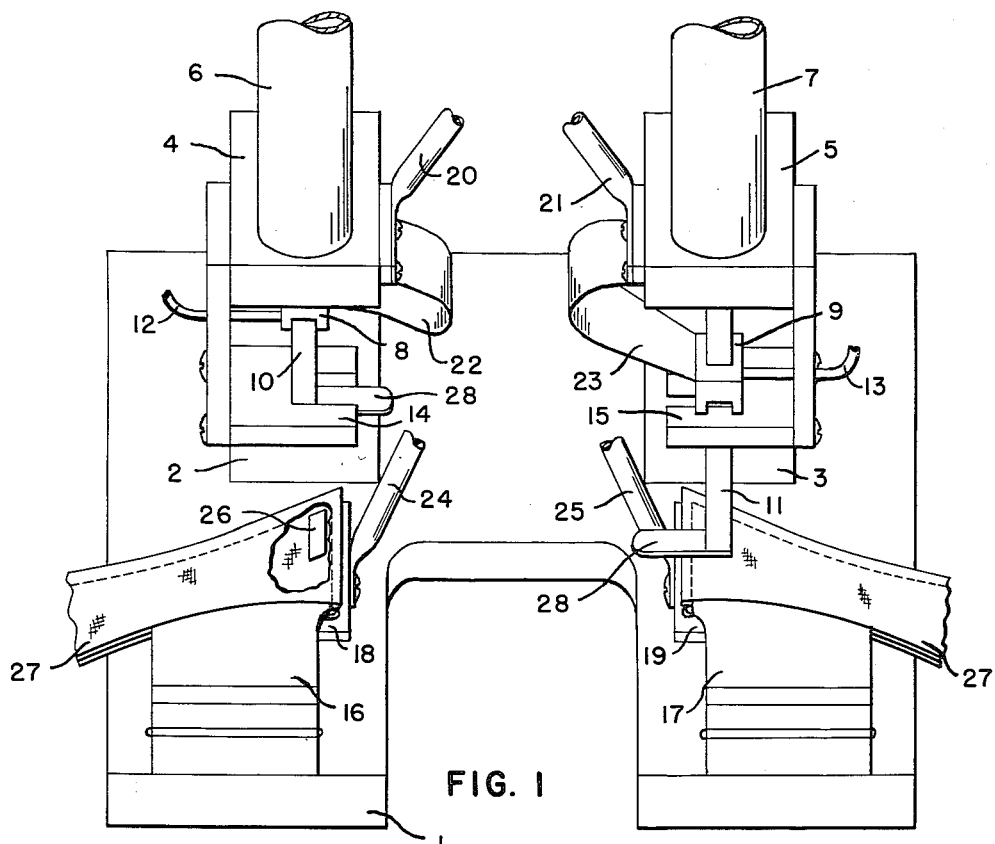
FIGURE 1 is an isometric view of fusing apparatus.
Figure 2:
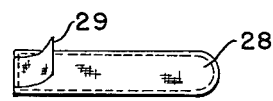
FIGURE 2 is a plan view of a collar tab.

In FIGURE 1, the fusing apparatus has two substantially identical fusing stations and fusing means at each of these stations. Forming part of each of these fusing means is a reciprocating upper electrode, which at the fusing station to the left is shown in its raised position and at the fusing station to the right in its lowered position.

In the practice of my invention, I use a collar tab 28 which has a patch of thermoplastic material 29, such as Vycron, which is Beaunit Mills' trademark for their polyester fiber, stitched to one end. For the collar stay 26 I use a thermoplastic, such as Mylar which is Du Pont's trademark for their polyester film. However, any suitable thermoplastic materials are considered to be within the scope of my invention.

Turning now to FIGURE 1 I have illustrated isometrically, one type of suitable apparatus that may be employed to practice my invention. As shown in this figure, an inclined base 1 has two heads 2 and 3 mounted thereon. Fixedly attached to the heads 2 and 3 are cylinder supporting blocks 4 and 5 retaining and supporting cylinders 6 and 7 in a vertical position. The ends of the cylinder shafts are fitted with electrically insulated electrode holders 8 and 9 to which the upper electrodes 10 and 11 are attached. These electrodes are energized by a high frequency generator (not shown) through conductors 20 and 21 connected to these electrodes through flexible connectors 22 and 23. Vacuum hoses 12 and 13 are connected at one end to a vacuum source (not shown) and convey vacuum to the fusing surfaces of the electrodes 10 and 11. Mounted on the side of the cylinder supporting blocks 4 and 5 are tab location guides 14 and 15. A collar tab 28 is positioned in each of the guides 14 and 15 and held in place against the ends of each of the electrodes 10 and 11 by the vacuum applied through the electrodes.

Collar supporting forms 16 and 17 are mounted on the base 1 in alignment with the vertical axis of the cylinders 6 and 7. Fixedly mounted beneath these collar supporting forms 16 and 17 are electrodes 18 and 19. Two conductors 24 and 25 from the high frequency generator are connected directly to these lower electrodes 18 and 19.

A description of the fusing operation will now be made with reference to the fusing means located to the left of FIGURE 1, it being understood that the fusing means located to the right operates in substantially the same manner. The operator places one end of a finished cape section of a garment collar 27 on the collar from 16 which has already had a stay 26 placed on it in a suitable holder. The operator in placing the cape section 27 on the form 16 places it so that the face ply and interliner ply of the cape section are below the form 16 and the rear ply is above this from with the stay 26 against the inner face of the rear collar ply. A collar tab 28 is then inserted in the tab location guide 14, the vacuum suction acting through a bored hole in the upper electrode 10 holds the tab in place, and the cylinder 6 is then actuated by the operator to force down the upper electrode 10. This brings the tab 28 in contact against the outer face of the rear collar ply 27 of the cape section.

Figure 3:
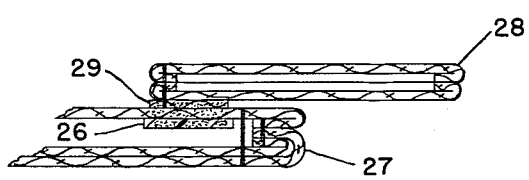
FIGURE 3 is a sectional side view of a completed collar with the attached stay and collar tab.
Figure 4:
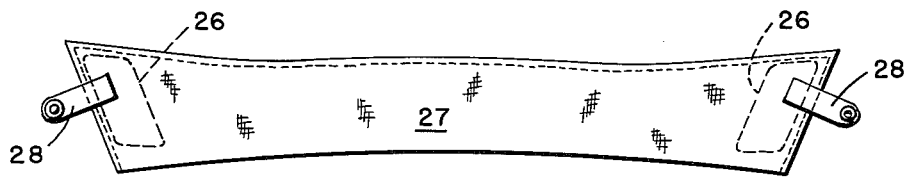
FIGURE 4 is a plan view of a complete cape section of a collar with attached stays and collar tabs.
Figure 5:
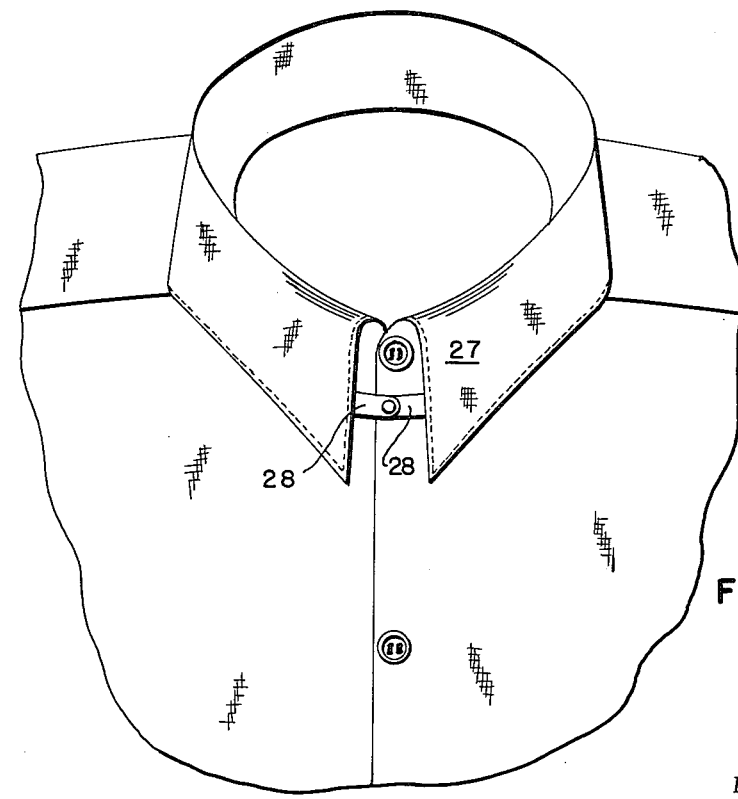
FIGURE 5 is a partial plan view of that shown in FIGURE 4 embodied in a shirt.

Conventional switching means actuated at the completion of the downward stroke of the cylinder 6 complete a circuit connecting the high frequency generator to the electrodes 10 and 18. This results in collar tab 28 and the collar stay 26, which are positioned on opposite sides of the rear collar ply 27, being fused together through the interstices of the rear collar ply 27. As a consequence of the fushing together of the collar tab 28 and collar stay 26 through the rear collar ply 27, as best seen in FIGURE 3, I have found that the attached tab 28 can withstand a tensile stress of 27.5 pounds, whereas a conventionally stitched collar tab will usually fail under a tensile stress of 8.8 pounds.

It will be understood that the various changes in the details and arrangement of parts which have been herein described and illustrated in order to explain the nature of the invention, may be made by those skilled in the art within the principle and scope of the invention as expressed in the appended claim.

I claim:

A multi-ply collar for wearing apparel having thermoplastic collar stays and collar closure tabs comprised in part of thermoplastic material, characterized by a fused attachment through the interstices of the outside back ply of said collar of each tab to each of said thermoplastic collar stays respectively, said fused attachment being the sole means of maintaining said collar stays in proper position within said collar and also of securing said tabs to said collar.

References Cited in the file of this patent

UNITED STATES PATENTS

| | | |
|---|---|---|
| 2,478,857 | Brown et al. | Aug. 9, 1949 |
| 2,560,157 | Colin | July 10, 1951 |
| 2,706,165 | Korsgaard | Apr. 12, 1955 |
| 2,975,428 | Pfeffer et al. | Mar. 21, 1961 |